Patented Dec. 1, 1925.

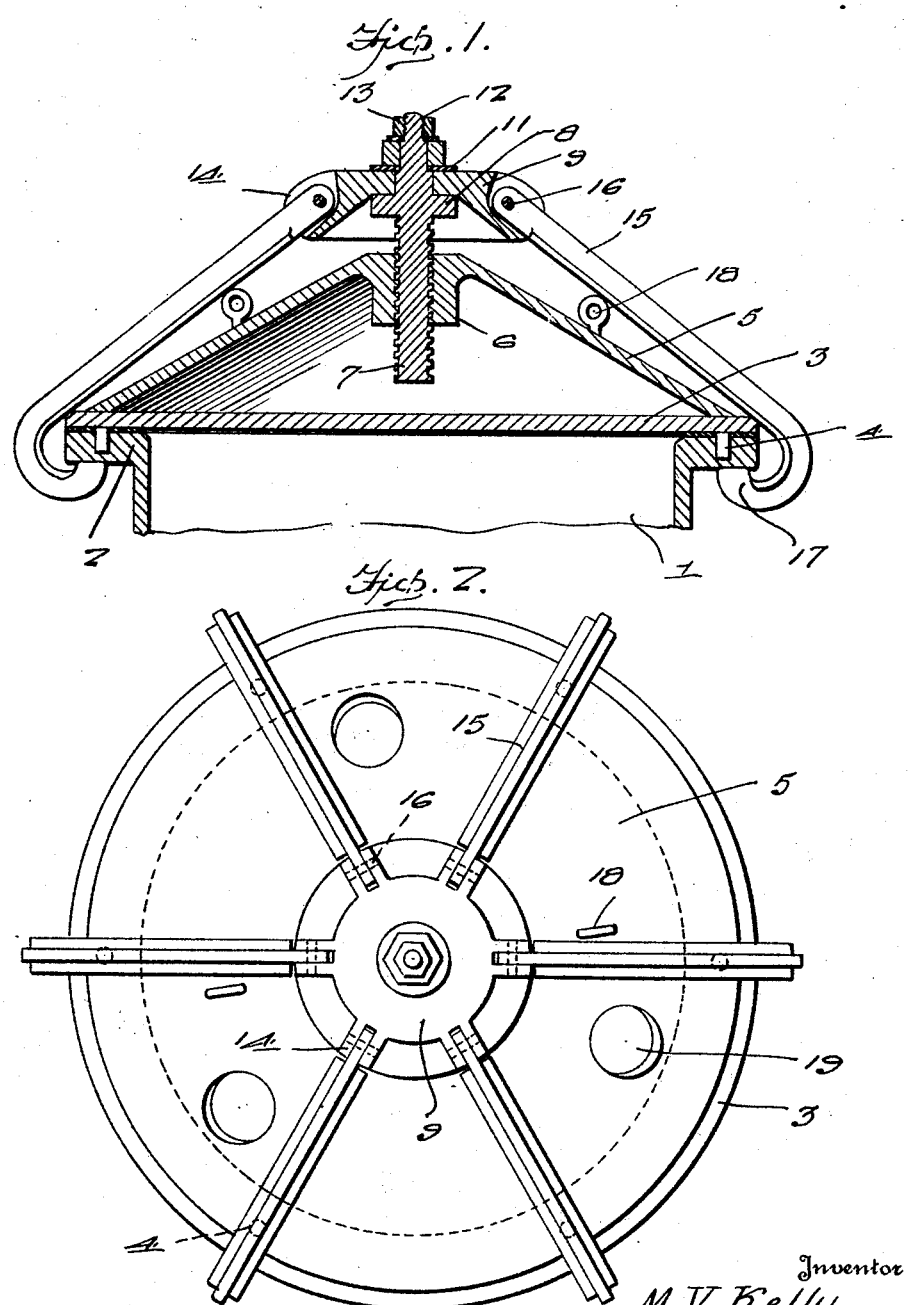

1,563,865

UNITED STATES PATENT OFFICE.

MASTON VINCENT KELLY, OF BEAUMONT, TEXAS.

CLOSURE-PLATE-SECURING MEANS.

Application filed December 27, 1924. Serial No. 758,398.

*To all whom it may concern:*

Be it known that I, MASTON VINCENT KELLY, a citizen of the United States, residing at Beaumont, in the county of Jefferson and State of Texas, have invented certain new and useful Improvements in a Closure-Plate-Securing Means, of which the following is a specification.

This invention relates to a device for securing the closure plate of high pressure stills or the like in such a manner as to obviate the necessity of having to employ fastening bolts such as are commonly used.

Another important object of the invention is to provide a closure plate securing device of the above mentioned character, which may be readily and easily associated with the flanged portion of a still and the closure plate therefor whereby considerable time and labor is saved in securing the closure plate.

A further object of the invention is to provide a device of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a sectional view showing the manner in which my improved device is associated with the flanged end of a still and the usual closure plate associated therewith, and Figure 2 is a top plan view thereof.

In the drawing wherein for the purpose of illustration is shown the preferred embodiment of my invention, the numeral 1 designates a portion of a still, the same being provided with an annular flange 2 at its end as clearly illustrated in Figure 1. Adapted to be disposed over the flanged end of the receptacle 1 is the closure plate 3 and the same is provided with a series of laterally extending pins 4 which fit in suitable recesses provided therefor in the flange 2. A gasket 5 is interposed between the closure plate 3 and the flange 2. Ordinarily the closure plate is secured on the flanged end of the receptacle of the still by fastening bolts and the use of such fastening means requires considerable labor as well as time.

In order to overcome the above disadvantages, I have provided a simple and efficient means for securing the closure plate on the flanged end of the receptacle of a still or the like, and the construction thereof will be presently described.

The securing means comprising a substantially conical head 5, the base of which engages the outer face of the closure plate 3 adjacent the peripheral edge thereof in the manner clearly illustrated in the drawing. An inwardly extending internally threaded sleeve 6 is provided in the apex of the conical head 5 and adapted for threaded engagement therewith is the adjusting screw 7. A shoulder 8 is formed on the upper portion of the adjusting screw 7.

A ring-like member 9 is swivelly supported on the upper portion of the adjusting screw 7 and the same rests on the shoulder 8 in the manner clearly illustrated in Figure 1. A nut 10 is fitted on the upper portion of the adjusting screw 7 above the ring 9 and provides a means for facilitating the rotation of the adjusting screw. A washer 11 is interposed between the nut 10 and the upper face of the ring 9. The upper end of the adjusting screw 7 is reduced and externally threaded as illustrated at 12 and supports thereon the lock nut 13. The lock nut 13 prevents the displacement of the ring and the nut 10 from the upper portion of the adjusting screw.

The ring-like member 9 is provided with a series of radially extending pairs of ears such as are shown at 14 and the same provide a means for pivotally securing the upper ends of the arms 15 which extend downwardly over the conical member 5. The pivotal support for the upper ends of the arms are illustrated at 16. The lower ends of the arms 15 terminate in the inwardly extending hooks 17, the same being adapted to extend over the edges of the flange 2 and the closure plate 3 respectively so that the free ends of the hooks 17 which are substantially flat will engage the under side of the flange on the receptacle 1 in a manner clearly illustrated in Figure 1.

With the parts arranged as shown in Figure 1 of the drawing, it is obvious that when the screw 7 is rotated in one direction by applying a wrench or other tool around the nut 10, the screw 7 will move outwardly with respect to the conical head 5 simultaneously causing an outward movement of the ring 9 which results in the flattened ends of the hooks 17 firmly engaging the under side of the flange 2 while an inward pressure is exerted on the conical head 5 whereby the base thereof will move tightly into engagement with the outer face of the closure plate 3 will then be securely positioned over the flanged end of the receptacle and will not become disengaged therefrom. By reversing the rotation of the screw member 7, the hooks 17 may be readily disengaged from the under side of the flange 2 and the securing device entirely removed from the closure plate so that access to the still may be had.

When not in use, the device may be suspended from any suitable support by means of the screw eyes 18 which are associated with the conical member 5. The conical member is further provided with a series of openings 19 to permit the fingers of a person to be inserted therein whereby the same may be readily removed from engagement with the closure plate 3.

While I have shown the preferred embodiment of my invention, it is to be understood that various changes in the size, shape and arrangement of parts may be resorted to without departing from the spirit of the invention and the scope of the appended claims.

Having thus described the invention, what I claim as new and desire to secure by Letters Patent is:—

1. In combination with a flanged receptacle, and a closure plate therefor, of means for securing the closure plate on said flanged receptacle comprising a conical member fitting against the outer face of the closure plate, an adjusting screw threaded through the apex of the conical member, a ring-like member swivelly supported on the outer end of the adjusting screw, and a plurality of hooks pivotally secured to said ring and engaging the under side of the flange on the receptacle.

2. In combination with a receptacle having a flange on one end, and a closure plate therefor, of means for securing the closure plate on said flange comprising a hollow conical member fitting against the outer face of the closure plate, an internally threaded sleeve extending inwardly from the apex of the conical member, an adjusting screw threaded in said sleeve, a ring-like member swivelly supported on the outer end of the adjusting screw, means associated with the outer end of the adjusting screw for facilitating the rotation thereof, a series of radially extending arms pivotally secured at their outer ends on said ring-like member, said arms extending downwardly over the conical member, hooks formed on the opposite ends of the arms and adapted for engagement with the under side of the flange on the receptacle.

In testimony whereof I affix my signature.

MASTON VINCENT KELLY.